US007454018B1

(12) United States Patent
Kerigan et al.

(10) Patent No.: US 7,454,018 B1
(45) Date of Patent: Nov. 18, 2008

(54) TRANSFER OF DVD DECODE KEY ON A WINDOW BY WINDOW BASIS TO AN ATTACHED DEVICE

(75) Inventors: Shaun Carl Kerigan, Inverclyde (GB); James Errol Harris, Jr., Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 1476 days.

(21) Appl. No.: 09/315,656

(22) Filed: May 20, 1999

(51) Int. Cl.
*H04K 1/00* (2006.01)
*H04N 7/173* (2006.01)

(52) U.S. Cl. ....................... 380/200; 380/201; 380/210; 380/212; 380/217; 725/25; 725/26; 725/104; 725/105; 725/110; 713/171; 713/182; 726/2

(58) Field of Classification Search ................. 713/200, 713/201, 160; 380/200, 201, 210, 212, 217; 709/229; 725/25, 26, 27, 28, 29, 30, 31, 725/104, 105, 110
See application file for complete search history.

(56) References Cited

U.S. PATENT DOCUMENTS 5,568,556 A 10/1996 Conley
5,825,876 A * 10/1998 Peterson, Jr. ................. 705/52
5,915,018 A 6/1999 Aucsmith
6,035,329 A * 3/2000 Mages et al. ................ 709/217
6,105,134 A * 8/2000 Pinder et al. ................ 713/170
6,236,727 B1 * 5/2001 Ciacelli et al. ............. 380/212
6,246,767 B1 * 6/2001 Akins et al. ................. 380/210

FOREIGN PATENT DOCUMENTS

WO 9827731 A1 6/1998

* cited by examiner

*Primary Examiner*—Kristine Kincaid
*Assistant Examiner*—Jenise E Jackson
(74) *Attorney, Agent, or Firm*—Carlos Munoz-Bustamante; Dillon & Yudell LLP

(57) ABSTRACT

Disclosed is apparatus for processing an encrypted data stream within a computer system adapted to receive the encrypted data stream from a data storage device. A data output device is coupled to a computer system and has a plurality of data output areas. An encrypted data stream is transferred from a data storage device to the data output device, the encrypted data stream being for output to one of the plurality of data output areas. The encrypted data stream is received and decrypted to produce a clear data stream for output to one of the plurality of data output areas. A decryption means receives a decryption key from the computer system, the decryption key relating only to the encrypted stream associated with the one of the plurality of data output areas.

10 Claims, 3 Drawing Sheets

TRANSFER OF DVD DECODE KEY ON A WINDOW BY WINDOW BASIS TO AN ATTACHED DEVICE

FIELD OF THE INVENTION

The present invention relates to apparatus and method for the transfer of a digital video disc (DVD) key for the decoding of encrypted, compressed DVD data to an attached device from a computer system or from an electronic display controller and more particularly for the transfer of such a key to an attached display device.

BACKGROUND OF THE INVENTION

Within the past decade, the advent of world-wide electronic communications systems has enhanced the way in which people can send and receive information. In particular, the capabilities of real-time video and audio systems have greatly improved in recent years. In order to provide services such as video-on-demand, video conferencing, and digital video disc (DVD) motion pictures, an enormous amount of bandwidth is required. In fact, bandwidth is often the main inhibitor in the effectiveness of such systems.

In order to overcome the constraints imposed by existing technology, compression systems have emerged. These systems reduce the amount of video and audio data which must be transmitted by removing redundancy in the picture sequence. At the receiving end, the picture sequence is decompressed and may be displayed in real time.

One example of an emerging video compression standard is the Moving Picture Experts Group ("MPEG") standard. Within the MPEG standard, video compression is defined both within a picture and between pictures. Video compression within a picture is accomplished by conversion of the digital image from the time domain to the frequency domain by a discrete cosine transform, quantization, variable length coding, and Huffman coding. Video compression between pictures is accomplished via a process referred to as "motion estimation", in which a motion vector plus difference data is used to describe the translation of a set of picture elements from one picture to another. The ISO MPEG2 standard specifies only the syntax of bitstream and semantics of the decoding process. The particular choice of coding parameters and tradeoffs in performance versus complexity is left to the system developers.

Digital Versatile Disc (DVD) is an emerging technology which due to its nature, requires extensive encryption in order to protect the data, such as a motion picture, against unauthorized copying.

DVD is a specification for the content of video, audio and other compressed data to be used as playback video, audio and, for example, subtitle data by a DVD decoder. The DVD video data is specified in the Moving Picture Experts Group (MPEG) standard (ISO/IEC 13818-2). As well as being represented by this standard, the data is also encrypted using the industry's Content Scrambling System (CSS), which produces an encrypted, encoded data stream for DVD playback. The data stream can be decrypted by hardware licensed to perform CSS decryption. Conventionally, CSS decryption occurs at a PCI card, which also conventionally includes MPEG decompression of the encrypted, encoded data signal. The decoded video signal is then transferred to a display device unencrypted. This means that it may be possible to attach a video storage device to the display interface so that it is able to store a copy of the decoded video data signal.

The present invention is directed in one particular aspect to improving upon this conventional DVD processing of the encrypted, encoded data stream.

SUMMARY OF THE INVENTION

Accordingly, the present invention provides apparatus for processing an encrypted data stream within a computer system adapted to receive the encrypted data stream from a data storage device, the apparatus comprising: a data output device coupled to said computer system and having a plurality of data output areas; means for transferring said encrypted data stream from said data storage device to said data output device, said encrypted data stream being for output to one of said plurality of data output areas; and decryption means associated with said data output device for receiving said encrypted data stream and for decrypting said encrypted data stream to produce a clear data stream for output to one of said plurality of data output areas, wherein said decryption means receives a decryption key from said computer system, said decryption key relating only to said encrypted data stream associated with said one of said plurality of data output areas.

Having the decryption means associated with the data output device means that the DVD data stream is transferred line by line over a Digital Video Interface in an encoded format. This means that it is not possible to attach a video storage device to the display interface in order to store a copy of the video data signal as the signal is encoded at this point.

Preferably, data associated with the one of said plurality of data output areas is not output if the decryption key associated with the one of said plurality of data output areas is not received; and data associated with others of said plurality of data output areas is output independent of the receipt or non-receipt of the decryption key associated with the one of said plurality of data output areas.

The decryption key relates only to the encrypted data stream which is to be output to the one of the data output areas. In the event that the decryption key is not received, others of the data output areas will be displayed on the data output device. For example, the desktop image will always be displayed, since there is no decryption key associated with the desktop image. Additionally, any data output areas that do not contain DVD data will also always be displayed. Another advantage of the decryption key only relating to one of the data output areas is that the decoding is within the data output area. This means that the start point of the data output area is not fixed as the data output area may be located at any point within the entire output area. If a single key is used for the entire data output area including the part which is encoded with the DVD key, then it is easier to attack the encrypted data stream as the start position of the encrypted data stream is known. Having the start point of the data output area in a random position means that it is more difficult to predict the start of DVD data and so attacking the encrypted data stream is made more difficult. This allows the use of a weaker key decode with a decode on a line by line basis.

Further preferably, data associated with one of said others of said plurality of data output areas is an encrypted data stream having a decryption key that differs from the decryption key associated with the encrypted data associated with the one of said plurality of data output areas.

This allows for the display of more than one encrypted data stream in separate data output areas of the data output device, each of the encrypted data streams being separately controlled by a different decryption key.

In a preferred embodiment, data associated with others of said plurality of data output areas is an unencrypted data stream having no decryption key.

This allows the use of a background image on the data output device, the background image not requiring, nor being encrypted. The unencrypted data stream may also be a conventional output displayed on the data output device that does not require, nor is encrypted.

In a further preferred embodiment, said decryption key contains an indication of the number of data output areas associated with the data output device which output encrypted data.

The invention also provides a method for processing an encrypted data stream within a computer system comprising the steps of: receiving an encrypted data stream from a data storage device; transferring said encrypted data stream from said data storage device to a data output device having a plurality of data output areas, said encrypted data stream being for output to one of said plurality of data output areas; receiving a decryption key in said data output device, said decryption key relating only to said encrypted data stream associated with said one of said plurality of data output areas; decrypting, in said data output device, said encrypted data stream to produce a clear data stream for output to one of said plurality of data output areas.

BRIEF DESCRIPTION OF THE DRAWINGS

Embodiments of the invention will now be described, by way of example, with reference to the accompanying drawings, in which.

DETAILED DESCRIPTION OF PREFERRED EMBODIMENTS OF THE INVENTION

Figure 1:
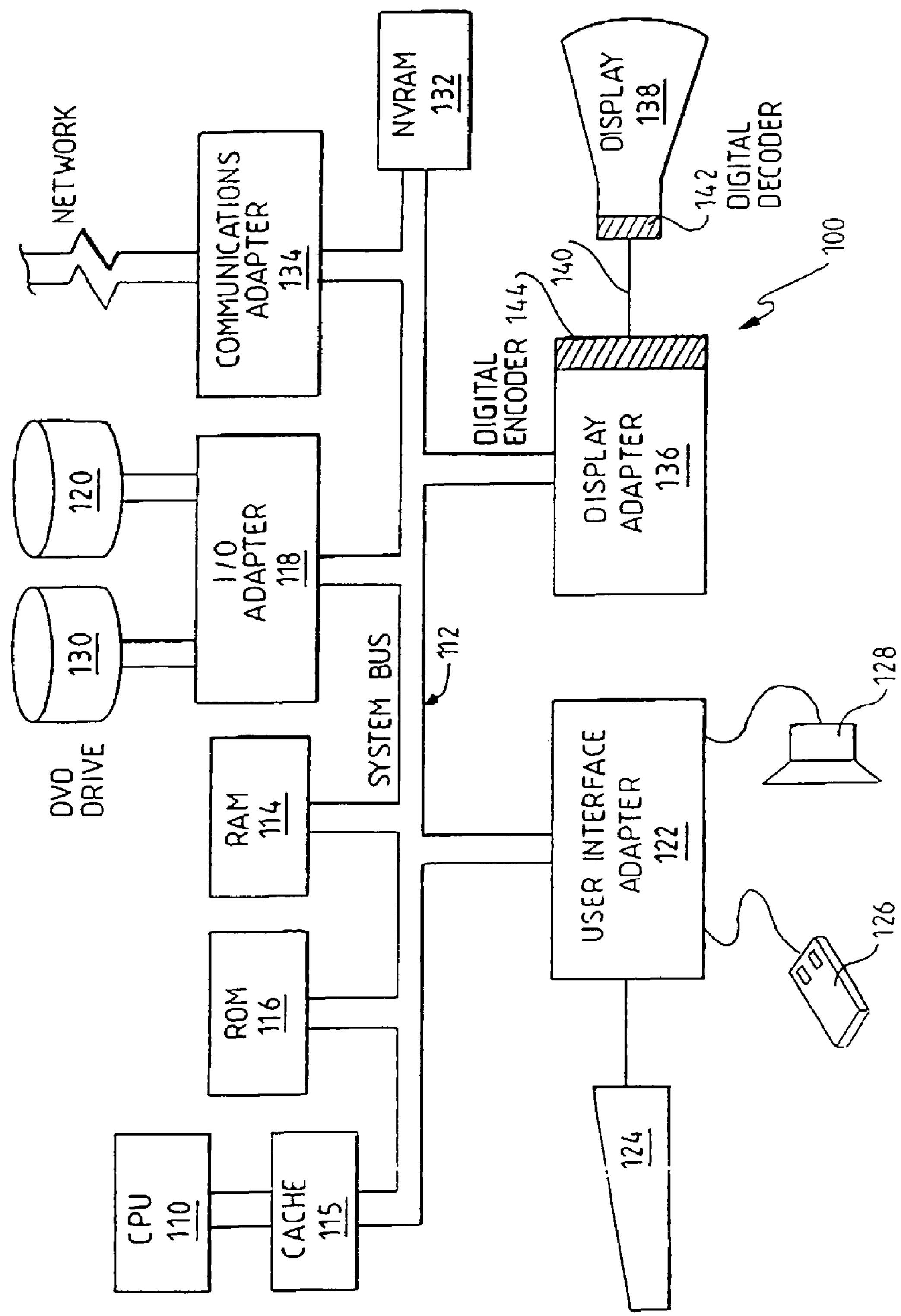
FIG. 1 depicts one embodiment of a computer system employing decryption apparatus in accordance with the present invention.

Referring firstly to FIG. 1, one embodiment of a computer system employing apparatus in accordance with the present invention is shown.

The invention will now be described with reference to a computing system 100 as illustrated in FIG. 1. The invention may also be used with other suitable hardware systems such as a laptop or a notepad computing system. Computing system 100 includes any suitable central processing unit 110, such as a standard microprocessor and any number of other objects interconnected via system bus 112. For the purposes of illustration, computing system 100 includes memory, such as Read Only Memory (ROM) 116, Random Access Memory (RAM) 114 and peripheral memory devices, for example, disk or tape drives 120, connected to system bus 112 via I/O adapter 118. Computing system 100 further includes a display adapter 136 for connecting system bus 112 to a display device 138. Also, user interface adapter 122 could connect system bus 112 to other user controls, such as keyboard 124, speaker 128, mouse 126 and a touch-sensitive pad (not shown). Computing system 100 further includes a DVD drive 130 for the retrieval of computer data and in particular, for the retrieval of movie data used to display films on a display 138 attached to the computing system 100.

Display device 138 incorporates a decoder/decompressor for data such as movie data originating from the DVD drive 130. Encrypted DVD data from the DVD drive 130 is transferred via system bus 112 to display adapter 136. The DVD data remains encrypted on the system bus 112, and is decrypted in the display adapter 136. The portion of the DVD data which is to be displayed in the DVD window on the display 138 is encrypted in digital encoder 144 for transmission to the display 138 over an interface 140.

Display 138 incorporates a decoder/decompressor 142, which receives the encrypted data from the interface 140 for display in a DVD window. The decoder/decompressor 142 also receives DVD decode keys for any windows of the desktop in which encoded DVD data is being displayed.

Figure 2:
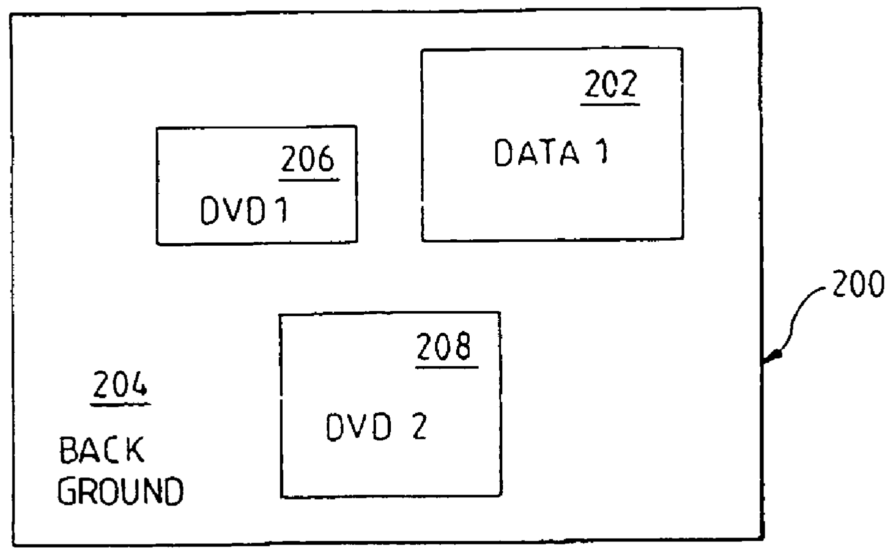
FIG. 2 is a typical screen image taken from the display of FIG. 1.

Referring to FIG. 2, a typical screen image 200 is shown as it appears on the display 138 of FIG. 1. The screen image 200 has a background 204 with data which is not in a DVD format and is not encoded appearing in a window 202. The background 204 and this data are correctly displayed in window 202 regardless of whether any DVD decode keys have been transmitted from the computing system 100 to the display 138 or not. Screen image 200 also contains two windows 206, 208 in which are displayed DVD data. The data in these windows 206, 208 is not displayed unless correct DVD decode keys for each of the windows 206, 208 has been transmitted from the computing system 100 to the display 138. Each of the windows 206, 208 has a separate key and data may be displayed in one window 206, but not the other 208 in the event that the key for that window 206 is received, but the key for the other window 208 is not received. A fresh key is sent for each frame of the displayed image.

Figure 3:
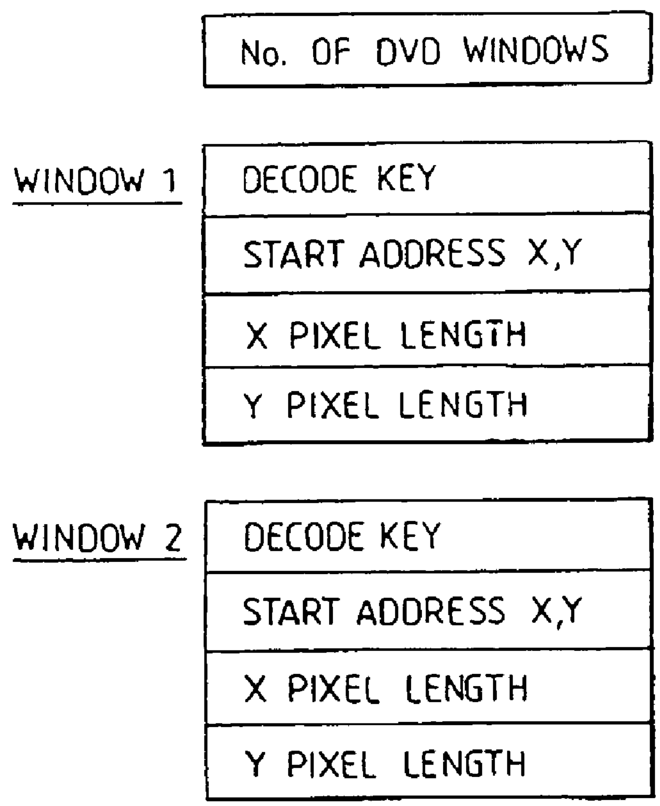
FIG. 3 is a representation of one embodiment of DVD disc data decode key in accordance with the present invention.

Referring to FIG. 3, which shows one embodiment of a DVD disc data decode key in accordance with the present invention. The first field of the decode key contains the 4 bit number of DVD windows presently displayed on the display 138. The second field of the decode key contains the 64 bit DES key used to decode the DVD data. The third field contains the 16 bit X pixel start address and the 16 bit Y pixel start address of the window. The fourth field contains the 16 bit X pixel length, giving the size in the X dimension of the DVD window. The fifth field contains the 16 bit Y pixel length, giving the size in the Y dimension of the DVD window. The second to fifth fields are then repeated for each of the DVD windows until data for all of the DVD windows represented by the 4 bit number of DVD windows in the first field has been included.

Figure 4:
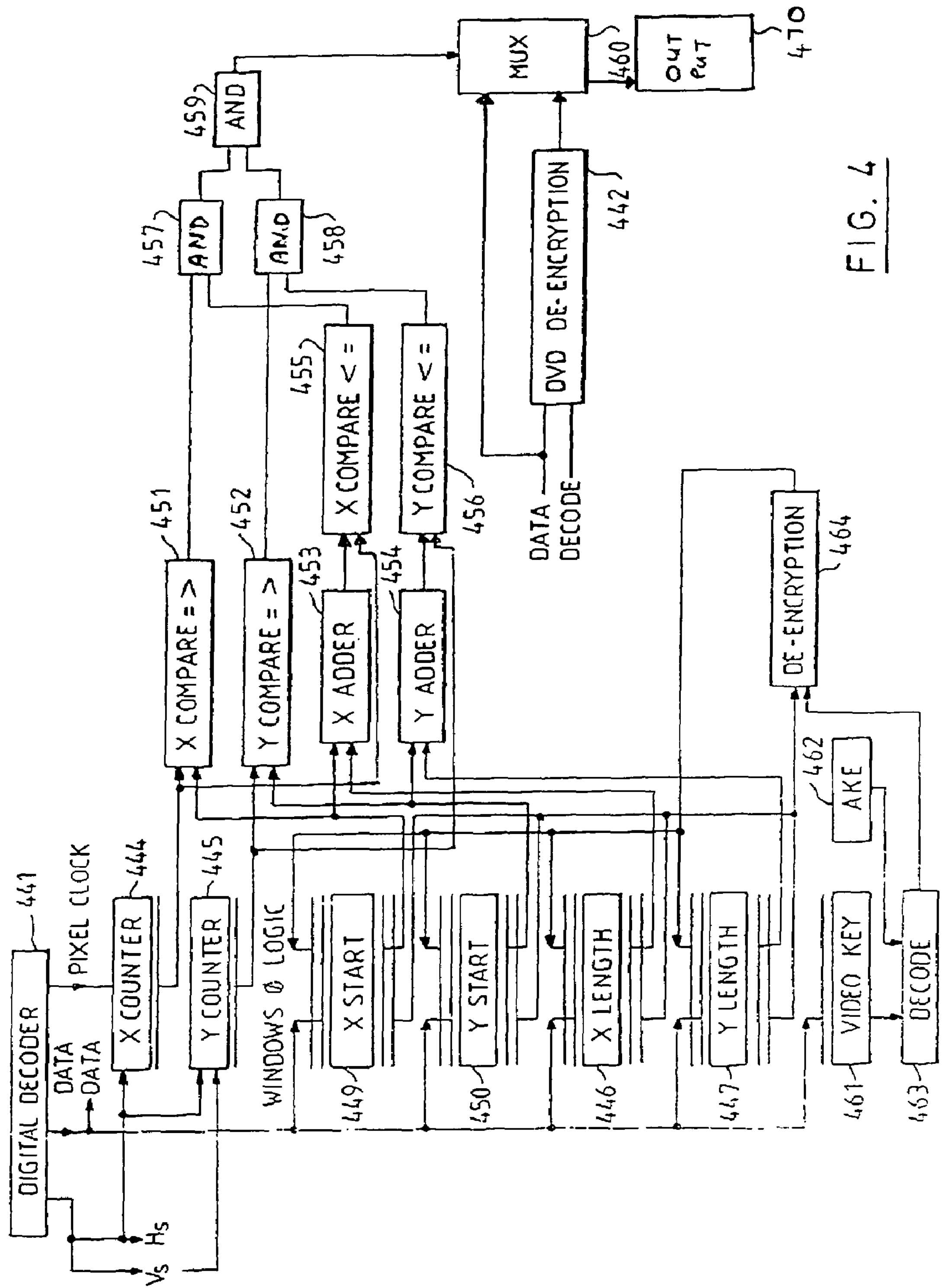
FIG. 4 is a block diagram of one embodiment of the digital decoder of FIG. 1 in accordance with the present invention.

Referring now to FIG. 4, which is a block diagram of one embodiment of the digital decoder of FIG. 1.

Display 138 incorporates a decoder 441 and a decompressor 442, which receives the encrypted DVD data from the interface 140. The decoder/decompressor 142 also receives DVD decode keys for any windows to be displayed on the display in which encoded DVD data is to be displayed. X address counter 444 is clocked by a pixel clock recovered from digital decoder 441. Y address counter 445 is clocked by a recovered data good signal or a horizontal synchronisation signal from digital decoder 441. X length register 446, Y length register 447, X start register 449 and Y start register 450 are loaded during the vertical synchronisation signal active period.

X address comparator 451 compares whether the contents of the X address counter 444 are greater than or equal to the X start register 449. Y address comparator 452 compares whether the contents of the Y address counter 445 are greater than or equal to the Y start register 450. These comparators provide a signal to AND gates 457, 458 that indicates that the current addresses in the X address counter 444 and the Y address counter 445 are such that they fall at or beyond the start of the window, that is, on a conventional display screen having addresses starting at the top left of the screen, that the current position is below and to the right of the top left corner of the window.

X Adder 453 adds the contents of the X Start register 449 to the contents of the X length register 446. Y Adder 454 adds the contents of the Y Start register 450 to the contents of the Y length register 447. X end comparator 455 compares whether the contents of the X address counter 444 are less than or equal to the output of the X Adder 453. Y end comparator 456 compares whether the contents of the Y address counter 445 are less than or equal to the output of the Y Adder 454. These comparators provide a signal to AND gates 457, 458 that indicates that the current addresses in the X address counter 444 and the Y address counter 445 are such that they fall at or before the end of the window, that is, on a conventional display screen having addresses starting at the top left of the screen, that the current position is above and to the left of the bottom right corner of the window. AND Gates 457, 458 together with AND gate 459 provide a signal that indicates that the current X counter 444 contents and the current Y counter 445 contents fall within the bounds of the displayed window.

DVD output multiplexer 460 receives a screen refresh data signal from digital decoder 441 and a decoded DVD data signal from DVD de-encryption 442. DVD output multiplexer 460 is switched between these two signals by the output of AND gate 459, which represents that the current X counter 444 contents and the current Y counter 445 contents fall within the bounds of the displayed window. The output from the DVD output multiplexer 460 is the decrypted DVD data when the current X counter 444 contents and the current Y counter 445 contents fall within the bounds of the displayed window and the data from the digital decoder 441 when the current X counter 444 contents and the current Y counter 445 contents do not fall within the bounds of the displayed window. The output from the DVD output multiplexer 460 is sent to the display 138. The DVD de-encryption is enabled when any one of the comparators 451, 452, 455 and 456 is in a true state.

In an embodiment where there are multiple windows on the display 138 in which DVD data is being displayed, the items having reference numerals 442 to 460 are repeated for each of the windows displaying DVD data.

Although the above embodiment has been described with respect to a display 138, the present invention is equally applicable to other types of data output device, for example, a printer which produces a screen print of the output of the display.

The usage of the decode key for each of the windows will now be described.

1. At the start of each frame, a decode key such as that of FIG. 3 is sent over interface 140 from the computing system 100 to the display decoder/decompressor 142. The decode key is combined with an AKE Key 462 and is used to decode the screen location of each window having DVD data displayed within it. The X Start register 449, Y Start register 450, X Length register 446 and Y Length register 447 are each loaded with the encoded data value and are then de-encrypted and the register reloaded with the de-encrypted value.

2. During each frame, video data in conventional format is transmitted over interface 140 from the computing system 100 to the display device 138. The video data corresponding to windows containing DVD data is transmitted over interface 140 in encrypted form.

3. When data corresponding to the windows containing DVD data is to be displayed, the decoder/decompressor 142 decodes/decompresses the data for display on the computer display 138, the DVD output being enabled by AND gate 159 which switches the data flow via DVD output multiplexer 160.

While the preferred embodiments have been described here in detail, it will be clear to those skilled in the art that many variants are possible without departing from the spirit and scope of the present invention. In particular, the preferred embodiments have been described in terms of a display device, whereas the present invention may also be advantageously applied to systems comprising other types of devices, such as printing devices. Equally, the invention should not be seen as limited to the particular architectures and protocols described in the preferred embodiments, as those skilled in the art will readily see that the invention may advantageously be applied in systems having other architectures and protocols.

The invention claimed is:

1. A method for processing an encrypted data stream within a computer system comprising the steps of:

receiving an encrypted data stream from a data storage device;

transferring said encrypted data stream from said data storage device to a data display device having a plurality of data display areas, said encrypted data stream being for output to one of said plurality of data display areas;

receiving a decryption key in said data display device, said decryption key relating only to said encrypted data stream associated with said one of said plurality of data display areas; and decrypting, in said data display device, said encrypted data stream to produce a clear data stream for output to one of said plurality of data display areas.

2. A method according to claim 1 wherein said decryption key is received during an interval between transmission of successive images to said data display device and is protected by a suitable secure code.

3. A method according to claim 1 wherein said decryption key is received during an interval between transmission of successive lines of each image to said data display device and is protected by a suitable secure code.

4. A method according to claim 1 wherein:

data associated with the one of said plurality of data display areas is not displayed if the decryption key associated with the one of said plurality of data display areas is not received; and data associated with others of said plurality of data display areas is displayed independent of the receipt or non-receipt of the decryption key associated with the one of said plurality of data display areas.

5. A method according to claim 4 wherein said data display device is a computer display and said data display areas are windows displayed on the display.

6. Apparatus according to claim 4 wherein data associated with one of said others of said plurality of data display areas is an encrypted data stream having a decryption key that differs from the decryption key associated with the encrypted data associated with the one of said plurality of data display areas.

7. A method according to claim 4 wherein data associated with others of said plurality of data display areas is an unencrypted data stream having no decryption key.

8. A method according to claim 4 wherein said decryption key contains an indication of the number of data display areas associated with the data display device which display encrypted data.

9. A method according to claim 4 wherein said decryption key contains an indication of the relative location of said data display area where said clear data stream is to be displayed.

10. A method according to claim 4 wherein said decryption key contains an indication of the size of said data output area where said clear data stream is to be displayed.

* * * * *